US010044389B2

(12) United States Patent
Merlin et al.

(10) Patent No.: US 10,044,389 B2
(45) Date of Patent: Aug. 7, 2018

(54) CONTACTLESS COMMUNICATION DEVICE WITH RECEIVER INPUT VOLTAGE STABILIZATION

(71) Applicant: NXP B.V., Eindhoven (NL)

(72) Inventors: Erich Merlin, Gratkorn (AT); Helmut Kranabenter, Gratkorn (AT); Stefan Mendel, Gratkorn (AT); Michael Pieber, Gratkorn (AT)

(73) Assignee: NXP B.V., Eindhoven (NL)

( * ) Notice: Subject to any disclaimer, the term of this patent is extended or adjusted under 35 U.S.C. 154(b) by 277 days.

(21) Appl. No.: 14/684,318

(22) Filed: Apr. 10, 2015

(65) Prior Publication Data
US 2015/0295608 A1 Oct. 15, 2015

(30) Foreign Application Priority Data

Apr. 11, 2014 (EP) ..................................... 14164512

(51) Int. Cl.
*H04B 1/00* (2006.01)
*H04B 1/12* (2006.01)
(Continued)

(52) U.S. Cl.
CPC ........... *H04B 1/123* (2013.01); *G06K 7/0008* (2013.01); *H04B 1/1036* (2013.01); *H04W 72/0446* (2013.01)

(58) Field of Classification Search
None
See application file for complete search history.

(56) References Cited

U.S. PATENT DOCUMENTS

| 3,904,975 A | * | 9/1975 | Satoh | H03G 3/3015 |
| | | | | 327/312 |
| 4,048,569 A | * | 9/1977 | Yamatani | H03G 3/3052 |
| | | | | 330/138 |

(Continued)

FOREIGN PATENT DOCUMENTS

| CN | 101001095 A | 7/2007 |
| CN | 101292254 A | 10/2008 |
| CN | 101449470 A | 6/2009 |

*Primary Examiner* — Zhiyu Lu

(57) ABSTRACT

There is described a contactless communication device. The device comprises (a) a receiver unit (110, 610) having an antenna input (RXn, Vmid, RXp) for connecting to an antenna, the receiver unit (110, 610) being adapted to couple with a transmitting device and to receive an RF signal transmitted by the transmitting device, the receiver unit (110, 610) being further adapted to determine a point of time relating to a position of data within the RF signal, (b) a comparator (120) adapted to generate a comparator output signal (agc_comp) which is indicative of a relation between a voltage at the antenna input (RXn, Vmid, RXp) of the receiver unit (110, 610) and a reference voltage (Vref), and (c) a voltage regulation circuit coupled to the comparator (120) and to the antenna input (RXn, Vmid, RXp) of the receiver unit (110, 610), the voltage regulation circuit being adapted to repetitively regulate the voltage at the antenna input (RXn, Vmid, RXp) based on the comparator output signal (agc_comp). The voltage regulation circuit is adapted to separate each repetitive regulation of the voltage at the antenna input (RXn, Vmid, RXp) by a first time constant prior to the point of time determined by the receiver unit (110, 610) and by a second time constant after the point of time determined by the receiver unit (110, 610), wherein the first time constant is smaller than the second time constant. There is also described a method, a computer program and a computer program product.

14 Claims, 5 Drawing Sheets

(51) Int. Cl.
*G06K 7/00* (2006.01)
*H04B 1/10* (2006.01)
*H04W 72/04* (2009.01)

(56) References Cited

U.S. PATENT DOCUMENTS

| | | | |
|---|---|---|---|
| 5,698,838 A | 12/1997 | Yamaguchi | |
| 6,023,740 A * | 2/2000 | Korhonen | G06F 13/26 710/124 |
| 6,121,849 A * | 9/2000 | McCollough | H03L 3/00 331/1 R |
| 7,926,719 B2 | 4/2011 | Spiess et al. | |
| 8,160,186 B2 | 4/2012 | Kang et al. | |
| 8,781,426 B2 | 7/2014 | Ciccarelli et al. | |
| 2004/0037377 A1 | 2/2004 | Brobston et al. | |
| 2004/0135673 A1 | 7/2004 | Oberhuber et al. | |
| 2006/0077080 A1 * | 4/2006 | Yamauchi | H03M 1/185 341/114 |
| 2006/0186995 A1 | 8/2006 | Wu et al. | |
| 2006/0214725 A1 * | 9/2006 | Rotchford | H03H 1/02 327/551 |
| 2006/0227910 A1 | 10/2006 | Ramasubramanian et al. | |
| 2007/0071455 A1 * | 3/2007 | Margalit | H03G 3/3084 398/202 |
| 2007/0147556 A1 * | 6/2007 | Kang | H03G 3/3078 375/345 |
| 2008/0039042 A1 | 2/2008 | Ciccarelli et al. | |
| 2010/0321128 A1 | 12/2010 | Merlin | |
| 2011/0080152 A1 | 4/2011 | Luzzi et al. | |
| 2011/0291811 A1 | 12/2011 | Nakano et al. | |
| 2012/0106219 A1 * | 5/2012 | Okuda | G06K 7/10237 363/127 |
| 2012/0222082 A1 * | 8/2012 | Su | H04B 1/18 725/151 |
| 2013/0337744 A1 * | 12/2013 | Lefley | H04B 5/00 455/41.1 |
| 2014/0017997 A1 * | 1/2014 | Sung | H04B 5/0031 455/41.1 |

\* cited by examiner

US 10,044,389 B2

CONTACTLESS COMMUNICATION DEVICE WITH RECEIVER INPUT VOLTAGE STABILIZATION

CROSS-REFERENCE TO RELATED APPLICATIONS

This application claims the priority under 35 U.S.C. § 119 of European patent application no. 14164512.7, filed on Apr. 11, 2014, the contents of which are incorporated by reference herein.

FIELD OF THE INVENTION

The present invention relates to the field of RF communication devices, in particular to RF communication devices having receiver input voltage stabilization.

ART BACKGROUND

Contactless Readers operating in the ISM frequency band at 13.56 MHz carrier frequency offer a contactless interface. This interface offers power for transponder chip operation and a half-duplex bi-directional communication to contactless Transponder cards (e.g. Smartcards, e-Passports, Ticketing, etc.) or Near Field Communication (NFC) devices. To guarantee interoperability between contactless Reader and Card/Transponder devices of different manufacturers, international standards specify the properties of the air interface, e.g. ISO/IEC14443 (the proximity base standard)+ISO/IEC10373-6 (the test standard for proximity systems), or EMVCo (the industry standard for payment, also for contactless payment), or ECMA 340, or NFC Forum. Conformance of products to these standards is essential, and especially for products in governmental use (e.g. e-Passport) this has to be certified by an accredited test Lab. Several properties are specified for the air interface of such contactless products and tested values have to be in a range defined by the standard.

In inductive coupled systems a reader generates a magnetic field that typically transfers energy, clock, and data to the transponder. The minimal field strength needed to supply and communicate with the transponder may typically decay with approximately 60 dB/dec in the near field.

Card-Mode: For card devices without power supply, the communication distance is typically limited by the minimal field strength to supply the card. For card devices with power supply (e.g. NFC devices in target-mode), the communication distance is typically limited by the minimal receiver voltage that allows a correct decoding of the reader command. In inductive coupled devices the voltage at the card receiver depends on the distance to the reader, the coupling factor, and the generated field strength of the reader device. The cards are typically designed to operate within a certain field strength range. Too large field strengths may destroy the device and too small field strengths are insufficient for a successful communication. A stabilization of the receiver input voltage may increase the dynamic range with respect to the operational field strength range. Thereby, for a given maximal field strength the communication distance can be increased or for a given communication distance the maximal field strength can be increased.

Reader-Mode: The antenna matching circuit of a reader device is detuned due to cards within the generated magnetic field. As a consequence the amplitude of the card response on the reader receiver input is reduced, which degrades the reception quality and thus the communication distance. Also in this case, a stabilization of the receiver input voltage to a constant value may result in a maximal receiver input signal, which is independent from de-tuning of the reader antenna.

US 2006/0186995 A1 describes transceivers for RFID readers and RFID transponders with an automatic gain control (AGC) circuit that adjusts the receiver gain according to the signal strength.

In all of the above cases, it is on the one hand desirable to use a voltage regulation or AGC system that provides a rapid correction of the receiver input voltage. On the other hand, however, using a rapidly adapting control system may influence the modulated data content of the received signal and thereby cause bit errors or even complete receiving failure.

There may thus be a need for a way of effectively stabilizing the receiver input voltage while at the same time avoiding negative influences on the modulated data content of the received signal.

SUMMARY OF THE INVENTION

This need may be met by the subject matter according to the independent claims. Advantageous embodiments of the present invention are set forth in the dependent claims.

According to a first aspect there is provided a contactless communication device, preferably for communication by use of inductive coupling. The device comprises (a) a receiver unit having an antenna input for connecting to an antenna, the receiver unit being adapted to couple, e.g. inductively with a transmitting device and to receive an RF signal transmitted by the transmitting device, the receiver unit being further adapted to determine a point of time relating to a position of data within the RF signal, (b) a comparator adapted to generate a comparator output signal which is indicative of a relation between a voltage at the antenna input of the receiver unit and a reference voltage, (c) a voltage regulation circuit coupled to the comparator and to the antenna input of the receiver unit, the voltage regulation circuit being adapted to repetitively regulate the voltage at the antenna input based on the comparator output signal, wherein the voltage regulation circuit is adapted to separate each repetitive regulation of the voltage at the antenna input by a first time constant prior to the point of time determined by the receiver unit and by a second time constant after the point of time determined by the receiver unit, wherein the first time constant is smaller than the second time constant.

This aspect is based on the idea that the receiver unit determines a point of time relating to a position of data within the received RF signal and that the voltage regulation circuit repetitively regulates the voltage at the antenna input using a first (smaller) time constant before the determined point of time and using a second (larger) time constant after the determined point of time. By using a relatively small time constant prior to the determined point of time, a rapid and effective adjustment of the voltage at the antenna input is provided before data is received. Further, by switching to a larger time constant at the determined point of time, the risk of causing errors in the received data is reduced.

The receiver unit may be adapted to determine the point of time relating to a position of data within the RF signal by detecting particular RF signal content or by adding a predetermined amount of time to a point of time where the RF signal is initially detected.

The comparator may be a single-bit comparator which outputs one bit value when the peak voltage at the antenna input is larger than the reference voltage and a second bit value when the peak voltage at the antenna input is smaller than the reference voltage.

The voltage regulation circuit uses the comparator output signal to determine whether the voltage at the antenna input is to be increased, i.e. when the comparator output signal indicates that the voltage at the antenna input is lower than the reference voltage, or is to be decreased, i.e. when the comparator output signal indicates that the voltage at the antenna input is larger than the reference voltage.

The voltage regulation circuit performs the regulation of the voltage at the antenna input in a repetitive manner. More specifically, subsequent instances of regulating the voltage at the antenna input occurs at regular time intervals, i.e. at times separated by either the first time constant (prior to the determined point of time) or the second time constant (after the determined point of time). Each regulation instance may apply a fixed amount of regulation (fixed step size) or a variable amount of regulation (variable step size). In the latter case, the amount of regulation may be determined as a function of a plurality of subsequent values of the comparator output signal.

The first time constant is small in the sense that an effective regulation of the voltage at the antenna input can be achieved in a short period of time (in consideration of the available time, which depends on the specific type of communication), i.e. so that the voltage at the antenna input is close to the reference voltage when the transmission of data begins and the voltage regulation circuit switches to the second (larger) time constant. The second time constant is chosen such any regulation of the voltage at the antenna input occurs so slowly that a negative impact on the data contents of the RF signal is avoided.

According to an embodiment, the voltage regulation circuit comprises a controller and a plurality of impedances connected to the antenna input, the controller being adapted to interconnect a number of the plurality of impedances based on the comparator output signal.

In other words, the controller is capable of interconnecting a selection of impedances to form a voltage divider for regulating the voltage at the antenna input.

According to a further embodiment, the plurality of impedances is a plurality of resistors.

According to a further embodiment, the controller is adapted to interconnect the number of the plurality of impedances such that said impedances are connected in parallel or in series.

In other words, the plurality of impedances forms a programmable or switchable impedance bank which is controlled by the controller in the sense that a number of impedances are connected in parallel (with each other and with an antenna connected at the antenna input of the receiver unit) or in series in dependency of the comparator output signal. More specifically, the controller may be adapted to generate a control signal based on the comparator output signal, the control signal indicating the number of impedances to be connected.

Each of the plurality of impedances may have the same impedance value or the plurality of impedances may be divided in groups where the impedances of each group have the same impedance value. Accordingly, the tuning curve (i.e. control signal value vs. total impedance value) may be linear or non-linear. In the case of a non-linear tuning curve, the tuning curve should be homogeneous.

The resistor bank is designed such that its maximal/minimal impedance value is large/small enough to cover the supported field strength range, e.g. such that the voltage at the antenna input (i.e. across the impedance bank) can be kept constant over a field strength range from 0.5 A/m to 7.5 A/m.

Furthermore, the granularity of the switchable impedance bank shall be as small as possible. There is a trade-off between die size and resolution. Therefore a nonlinear tuning curve may be exploited to reduce the area consumption while the resolution is kept constant in terms of Rx-voltage switches. The parasitic capacitance shall be as small as possible to avoid a low-pass characteristic within the RF frequency band.

The plurality of impedances and the controller provide a simple and effective means of adjusting the voltage at the antenna input in dependency of the comparator output signal, such that the voltage at the antenna input can be closely matched to the reference voltage.

According to a further embodiment, the receiver unit is adapted to provide a clock signal having a predetermined frequency, the first time constant equals a first factor divided by the predetermined frequency, the second time constant equals a second factor divided by the predetermined frequency, and the second factor is larger than the first factor.

The receiver unit may comprise a clock signal generator for generating the clock signal having the predetermined frequency, or the receiver unit may be adapted to derive the clock signal from a received signal.

The first factor and the second factor may be rational numbers, such as in particular natural numbers.

In the case of natural numbers and an exemplary predetermined frequency of 13.56 MHz, the first and second time constants may take on values such as 1/13.56 MHz, 2/13.56 MHz, 3/13.56 MHz, . . . , n/13.56 MHz. Thus, in this case the first and second time constants correspond to an integer multiple of cycles of the clock signal. Since the second factor is larger than the first factor, if the first time constant equals a first number of cycles of the clock signal, the second time constant will include at least one additional cycle of the clock signal.

According to a further embodiment, the clock signal is based on a recovered clock signal having the frequency of the RF signal generated by the transmitting device, and wherein the comparator output signal is aligned with the clock signal.

By aligning the comparator output signal with the clock signal based on the recovered clock signal, it can be assured that the peak voltage at the antenna input is compared with the reference voltage.

Thereby, a reliable comparator output signal can be obtained which is indicative of the relation between the reference voltage and the amplitude of the voltage at the antenna input of the receiver unit.

According to a further embodiment, the voltage regulation circuit is adapted to apply a first voltage regulation step size prior to the point of time determined by the receiver unit and to apply a second voltage regulation step size after the point of time, wherein the first voltage regulation step size is larger than the second voltage regulation step size.

In case the voltage regulation circuit utilizes a plurality of resistors as described in an embodiment above, the first voltage regulation step size may be realized by simultaneously connecting or disconnecting several (e.g. four) of the resistors and the second (smaller) voltage regulation step size may be realized by connecting or disconnecting a lower number (e.g. one) of the resistors.

It is noted that the second voltage regulation step size may even be set to zero, such that the voltage regulation circuit does not apply any adjustments after the point of time determined by the receiver unit.

By using a relatively large first voltage regulation step size together with the relatively small first time constant, the time needed to adjust the voltage at the antenna input of the receiver unit to equal (or be very close to) the reference voltage can be further reduced.

Similarly, by using a relatively small second voltage regulation step size together with the relatively large second time constant, the risk of causing bit errors in the received data signal can be further reduced. It is noted that the second voltage regulation step size may even be set to zero, such that the voltage regulation circuit does not apply any adjustments after the point of time determined by the receiver unit.

According to a further embodiment, the receiver unit is adapted to operate in a card-mode and to determine the point of time as the time where a reader-command is received from the transmitting device.

In this embodiment, the receiver unit may comprise a PICC (Proximity Integrated Circuit Card) receiver module and analog demodulators as needed. Upon detection of the RF field from a transmitting (peer) device, the voltage regulation circuit starts adjusting the voltage at the antenna input of the receiver using the first (small) time constant. Once the reader-command is received, the voltage regulation circuit switches to the second (larger) time constant.

According to a further embodiment, the receiver unit is adapted to operate in a reader-mode and to determine the point of time as the time where a preamble is received or where a predefined bit grid begins or where a predetermined minimal time before reception expires.

In this embodiment, the receiver unit may comprise a PCD (Proximity Coupling Device) receiver module with baseband amplifier and I/Q channel A/D converters.

Depending on the specific implementation, the voltage adjusting circuit switches from the first (smaller) time constant to the second (larger) time constant once one of the following events occurs: a preamble (indicating a beginning of data transmission) is detected by the receiver unit, a predefined bit grid (e.g. a Miller Bit-Grid) begins, within which a response is supposed to be transmitted, or a predetermined minimal time expires, after which a response is supposed to be transmitted.

According to a further embodiment, the second time constant is infinite.

This is to be understood such that the voltage regulation circuit does not make any adjustments of the voltage at the antenna input of the receiver unit when using the second time constant. In other words, the voltage regulating mechanism is frozen.

According to a further embodiment, the device further comprises a signal processor coupled to the receiver unit and adapted to process signals received by the receiver unit, wherein the voltage regulation circuit is further adapted to generate a signal processor control signal indicating that the signal processor is to be turned off for a predetermined period after each repetitive regulation of the voltage at the antenna input.

By deactivating (or blinding) the signal processor for a predetermined period following an adjustment of the voltage at the antenna input, it can be assured that the corresponding voltage changes are not misinterpreted as data.

Thereby, the robustness of the device is further improved.

According to a second aspect, there is provided a method of stabilizing an antenna input voltage of a receiver unit in an RF communication device for communication by use of inductive coupling, such as a contactless communication device for communicating by use of inductive coupling, the receiver unit being adapted to couple, e.g. inductively with a transmitting device and to receive an RF data signal transmitted by the transmitting device. The method comprises (a) determining a point of time relating to the start of the RF data signal, (b) generating a comparator output signal which is indicative of a relation between a voltage at the antenna input of the receiver unit and a reference voltage, and (c) repetitively regulating the voltage at the antenna input based on the comparator output signal, wherein each repetitive regulation of the voltage at the antenna input is separated by a first time constant prior to the determined point of time and by a second time constant after the determined point of time, wherein the first time constant is smaller than the second time constant.

This aspect is essentially based on the same idea as the first aspect described above and the method may preferably be implemented in a device according to the first aspect or any of the embodiments thereof as described above.

According to a third aspect, there is provided a computer program comprising computer executable instructions which when executed by a computer causes the computer to perform the steps of the method according to the second aspect.

According to a fourth aspect, there is provided a computer program product comprising a computer readable data carrier loaded with a computer program according to the third aspect.

It should be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless otherwise indicated, in addition to any combination of features belonging to one type of subject matter also any combination of features relating to different subject matters, in particular a combination of features of the method type claims and features of the apparatus type claims, is also disclosed with this document.

The aspects defined above and further aspects of the present invention will be apparent from the examples of embodiment to be described hereinafter and are explained with reference to the examples of embodiment. The invention will be described in more detail hereinafter with reference to examples of embodiment to which the invention is, however, not limited.

DETAILED DESCRIPTION

Figure 1:
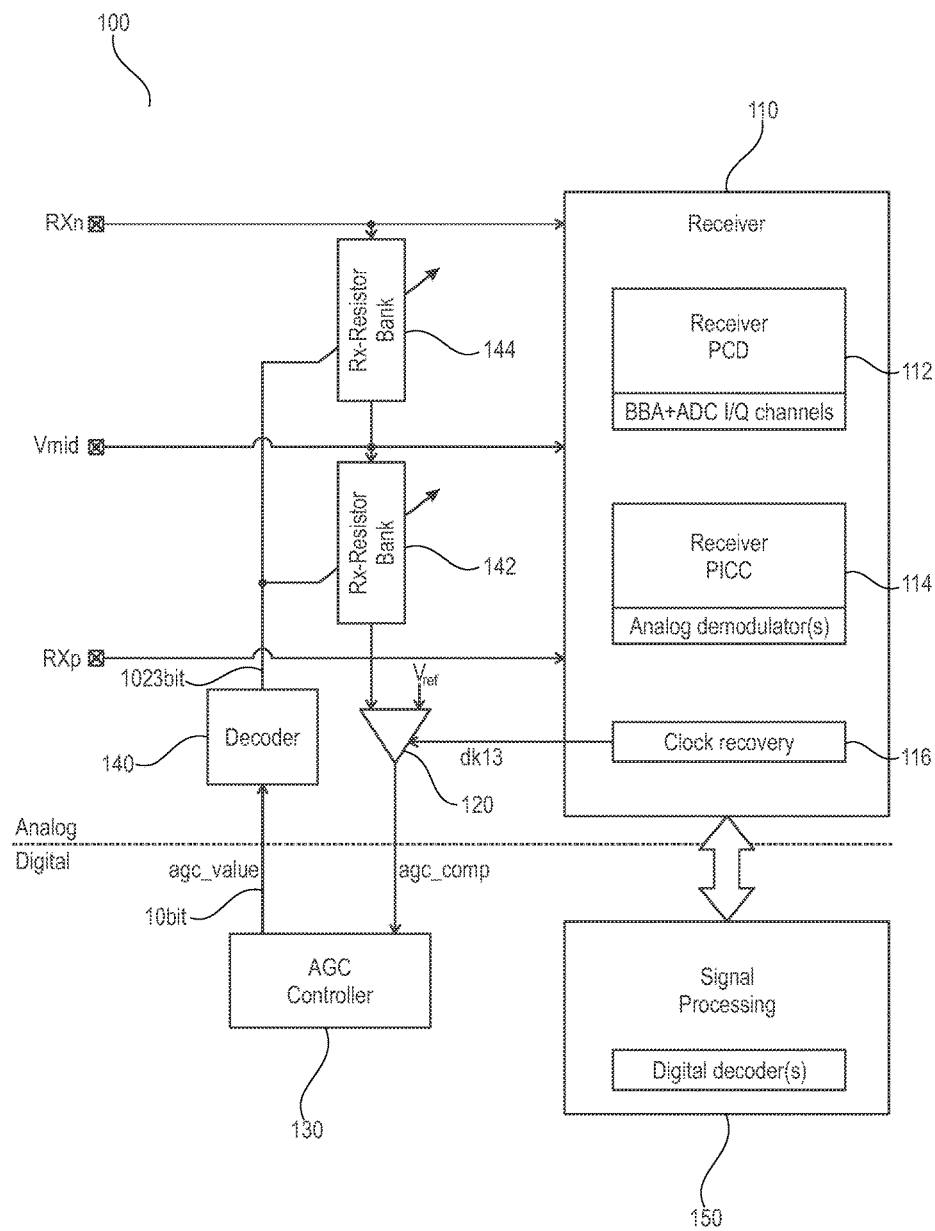
FIG. 1 shows a partial block diagram of a contactless communication device in accordance with an embodiment.

The illustration in the drawing is schematic. It is noted that in different figures, similar or identical elements are provided with the same reference signs or with reference signs, which differ only within the first digit.

FIG. 1 shows a partial block diagram of a contactless communication device 100 in accordance with an embodiment. More specifically, the contactless communication device 100 comprises a receiver unit 110, a comparator 120, an AGC controller 130, a decoder 140, programmable resistor banks 142 and 144, and a signal processor 150. As indicated by the stipulated line, the receiver unit 110, the comparator 120, the decoder 140, and the resistor banks 142, 144 are analog components while the controller 130 and the signal processor 150 are digital components. For the sake of completeness, it is noted that the contactless communication device 100 comprises further units and components which are not shown in FIG. 1 as these are not of particular relevance for the present invention.

The receiver unit 110 comprises a PCD receiver module 112 with baseband amplifier (BBA) and I/Q channel ADCs for operating in reader-mode, a PICC receiver module 114 with analog demodulator(s) for operating in card-mode, and a clock recovery module 116 for providing a recovered clock signal clk13 derived from an incoming RF field from a transmitting device (not shown). In the present embodiment, the receiver unit 110 is a differential receiver having a positive input terminal RXp, a negative input terminal RXn and a reference input terminal Vmid. The programmable resistor bank 142 is arranged between RXp and Vmid, and the programmable resistor bank 144 is arranged between RXn and Vmid. It is noted that the present invention is equally applicable to receiver units with single ended antenna input, in which case only a single resistor bank is necessary.

Returning to the embodiment of FIG. 1, the comparator 120 is arranged to receive the voltage at antenna input terminal RXp as one input and a reference voltage Vref as another input. The reference voltage Vref may be programmable at the production stage. The comparator 120 also receives the recovered clock signal clk13 from the receiver unit 110 such that the comparator 120 can compare the peak voltage at RXp with Vref and output a one-bit signal comparator output signal agc_comp indicating whether the peak voltage at RXp is larger or smaller than Vref.

The AGC controller 130 receives the comparator output signal agc_comp from the comparator 120 and generates a control signal agc_value indicating how many of the resistors in each of the resistor banks 142, 144 are to be connected in parallel across the respective antenna input terminals in order to adjust the corresponding receiver input voltage. The digital signal agc_value is a 10-bit signal with possible values from 0 to 1023. The operation of the controller 130 will be described in further detail in conjunction with the following figures.

The decoder 140 receives the control signal agc_value from the controller 130 and converts the 10-bit value of agc_value into a 1023-bit thermometer (or unary) coded control signal. For each logic one of this control signal, a resistor of resistor bank 142 is added in parallel with the positive antenna input RXp and a resistor of resistor bank 144 is added in parallel with the negative antenna input RXn in order to regulate the receiver input voltage. Thereby, a constant control value of 0x00 (0 decimal) corresponds to the highest sensitivity and largest receiver voltage and a control value of 0x3FF (1023 decimal) corresponds to the smallest sensitivity and the smallest receiver voltage.

Figure 2:
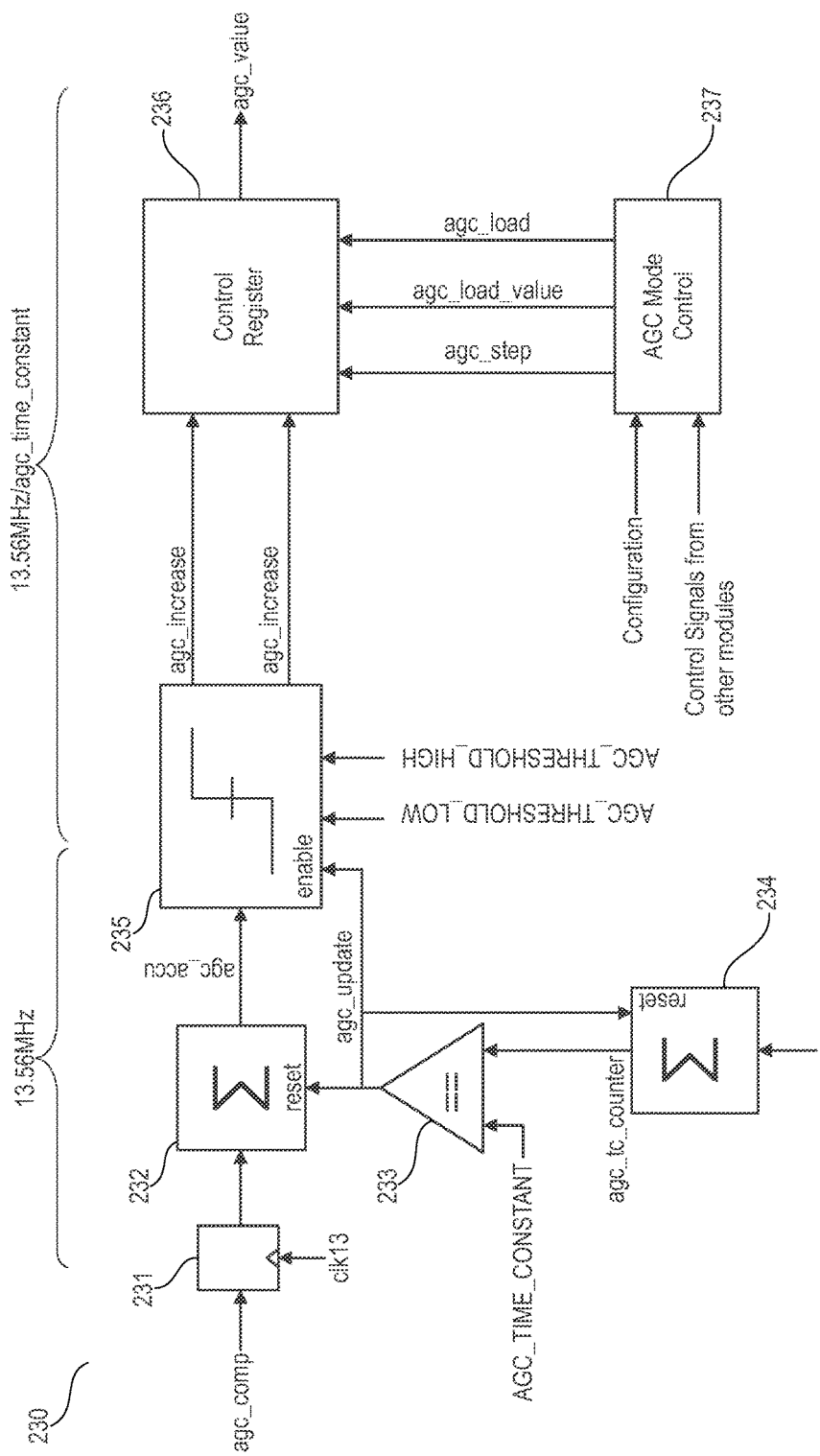
FIG. 2 shows a detailed block diagram of an input voltage regulator controller in accordance with an embodiment.

FIG. 2 shows a detailed block diagram of an input voltage regulator controller 230 (corresponding to AGC controller 130 in FIG. 1) in accordance with an embodiment. More specifically, the controller 230 implements an integrate-and-dump filter and a one bit integrator. First, the input agc_comp is (optionally) synchronized by synchronizer 231 in case the digital clock frequency is not aligned with the analog clock frequency. In the present embodiment, the clock frequency is 13.56 MHz. Then the comparator value agc_comp is accumulated by accumulator 232 for AGC_TIME_CONSTANT clock cycles. This accumulation of agc_comp is controlled by counter 234 and comparator 233 and is, as indicated above accumulator 232, performed at the clock frequency of 13.56 MHz.

The resulting accumulator value agc_accu is input to threshold comparator 235 and if agc_accu is above a certain threshold AGC_THRESHOLD_HIGH, then the control value agc_value in integrator 236 is increased (by agc_step). On the other hand, if the resulting accumulator value agc_accu is below a certain threshold AGC_THRESHOLD_LOW, then the AGC value agc_value is decreased (by agc_step). If the resulting accumulator value agc_accu is between the thresholds AGC_THRESHOLD_HIGH and AGC_THRESHOLD_LOW, no change is made to the control value agc_value. As indicated above threshold comparator 235 and integrator 236, this operation is performed at a frequency equal to the clock frequency (13.56 MHz) divided by AGC_TIME_CONSTANT.

Thus, the value of the AGC_TIME_CONSTANT defines the bandwidth of the control loop. In other words, a large AGC_TIME_CONSTANT results in a narrow bandwidth and slow adaptation, while a small AGC_TIME_CONSTANT results in a wide bandwidth and fast adaptation.

Furthermore, the controller comprises a control block 237 that allows for loading values into the AGC register (e.g., start values or fixed values), freezing the adaptation, and defining the step-size.

Figure 3:
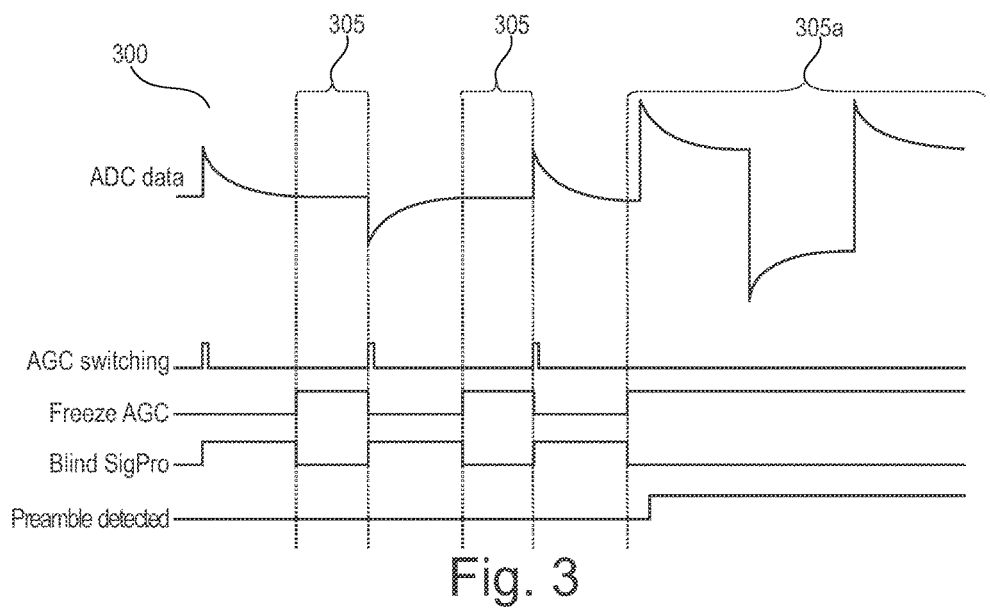
FIG. 3 shows a series of signals as functions of time during operation of a device in accordance with an embodiment.

FIG. 3 is a plot 300 that shows a series of signals as functions of time during operation of a device 100 in accordance with an embodiment. More specifically, the plot 300 relates to operation of a device 100 in reader-mode according to a standard utilizing a preamble (e.g. ISO14443-Type B 106 kBd)

More specifically, the upper curve shows the signal (ADC data) provided by the ADC of the PCD receiver module 112 in FIG. 1 while receiving an RF signal from a transmitter (not shown). The next curve (AGC switching) shows a pulsed signal that controls the switching of the programmable resistor banks 142, 144 that is applied by the controller 130 in FIG. 1. The pulses of AGC switching are aligned with a recovered clock signal obtained from the ADC data signal. The third curve (Freeze AGC) is a signal that freezes the AGC (i.e. controls the controller 130 to maintain the last configuration of resistor banks 142, 144) when going high. As can be seen, the signal Freeze AGC is temporarily high (in periods 305) prior to a pulse in the AGC switching signal. The fourth curve (Blind SigPro) is a signal that temporarily (when going high) blinds or disables the signal processor 150 in FIG. 1 in order to avoid that the signal processor 150 wrongly interprets a voltage change caused by switching of the controller 130 as signal content. Finally, the fifth curve (Preamble detected) shows a signal indicating detection of a preamble in the ADC data signal.

As can be seen, once the preamble is detected, Freeze AGC is maintained high and Blind SigPro is maintained low during the following data reception period 305a. Prior to detection of the preamble at 305a, the AGC controller 130 is operated with a fast time constant (i.e. one cycle of the recovered clock signal) to achieve a fast adaptation of the antenna input voltage.

Figure 4:
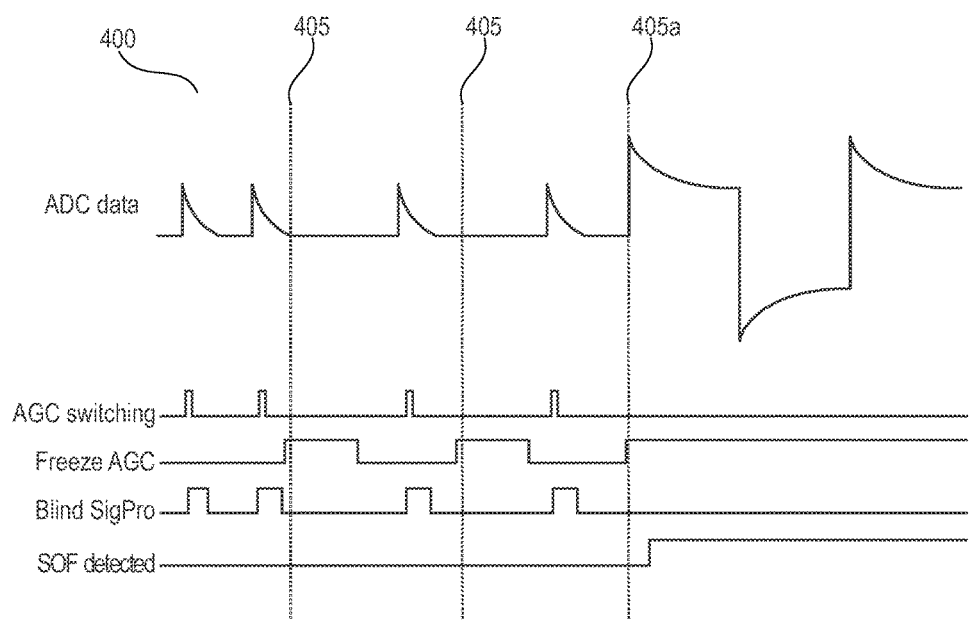
FIG. 4 shows a series of signals as functions of time during operation of a device in accordance with an embodiment.

FIG. 4 is a plot 400 that shows a series of signals as functions of time during operation of a device 100 in accordance with an embodiment. More specifically, the plot 400 relates to operation of a device 100 in reader-mode according to a standard utilizing a Bit-grid (e.g. ISO14443-Type A 106 kBd).

This embodiment is very similar to the one shown in FIG. 3 and discussed above. Therefore, only the difference will be discussed in the following. As can be seen, the fifth (lowermost) signal "SOF detected" differs from FIG. 3 and represents the result of a detection of an SOF (start-of-frame). More specifically SOF detected is low as long as no SOF is detected and goes high once an SOF is detected. In this embodiment, a data transmission (card response) is required to occur within a certain bit-grid, the beginning of which is indicated as 405. Slightly before a response may occur, the signal Freeze AGC is driven high. As long as no SOF (start-of-frame) is detected, Freeze AGC is driven low again after some time and the AGC controller 130 is allowed to switch again. Once an SOF is detected, i.e. shortly after 405a, Freeze AGC is maintained high such that no further adaption is allowed to be performed. Prior to detection of the SOF after 405a, the AGC controller 130 is operated with a fast time constant (i.e. one cycle of the recovered clock signal) to achieve a fast adaptation of the antenna input voltage.

Figure 5:
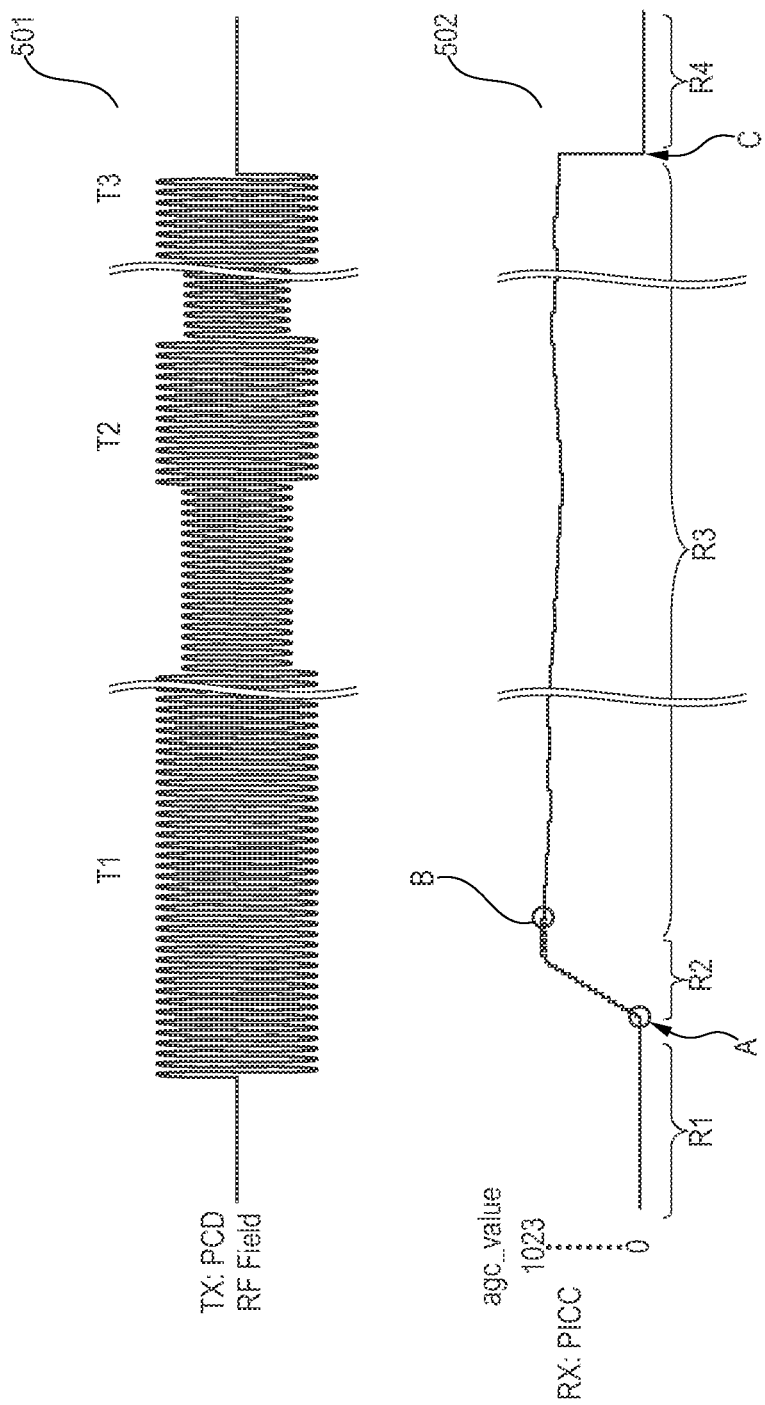
FIG. 5 shows a series of signals as functions of time during operation of a device in accordance with an embodiment.

FIG. 5 shows plots 501 and 502 that respectively show a series of signals as functions of time during operation of the device 100 accordance with an embodiment. More specifically, the plot 501 shows a series of signals as a function of time when the device 100 operates as transmitter, while the plot 502 shows a series of signals as a function of time when the device 100 operates as receiver in card-mode in. The operation of the AGC is shown from the receiver (target) perspective. More specifically, the plot 501 relates to operation of the device 100 as reader (transmitting data), while the plot 502 relates to operation of the device 100 as card (receiving data).

As shown in the plot 501, the operation as transmitter in reader mode (corresponding at NFC active mode) is divided in three phases respectively indicated as T1, T2 and T3. In the first phase T1, the RF field is turned on. After some time (approximately 75 µs), data transmission takes place during the phase T2. After finalizing the transmission, the operation ends in phase T3 where the RF field is turned off.

The plot 502 shows the corresponding operation in card-mode (corresponding to NFC passive mode), where the device 100 receives a transmission corresponding to the plot 501. During a first period R1, no RF field is detected and the AGC does not operate. Then, an RF field is detected and the AGC starts operating at A to adjust the receiver input voltage. Since the communication is transmitted already ~75 µs after the RF field is switched on, a fast mode is used during period R2 to adjust the receiver input voltage after the detection of an external field. More specifically, during the fast mode operation the AGC is operated with a fast time constant, e.g. one clock cycle, and a larger step size, e.g. four times the resolution of the programmable resistor banks 142, 144. In other words, in each RF clock cycle the AGC value is changed by 4 LSB. After a predetermined period of time (max. 75 µs), the period of fast adaptation R2 ends at B and the AGC enters period R3 in which a slower time constant (e.g. between 1 and 1024 clock cycles) and/or a smaller step size (e.g. 1 LSB) may be used. The adaptation during R3 is designed to have minimum adverse influence on the reception of data while still providing a relatively effective regulation of the receiver input voltage. Finally, when the external field vanishes, the AGC value is automatically switched to zero at C in to be maximally sensitive for the detection of other external fields in the subsequent period R4 (corresponding to R1). In case no field is detected the internal field is switched on for transmission.

Figure 6:
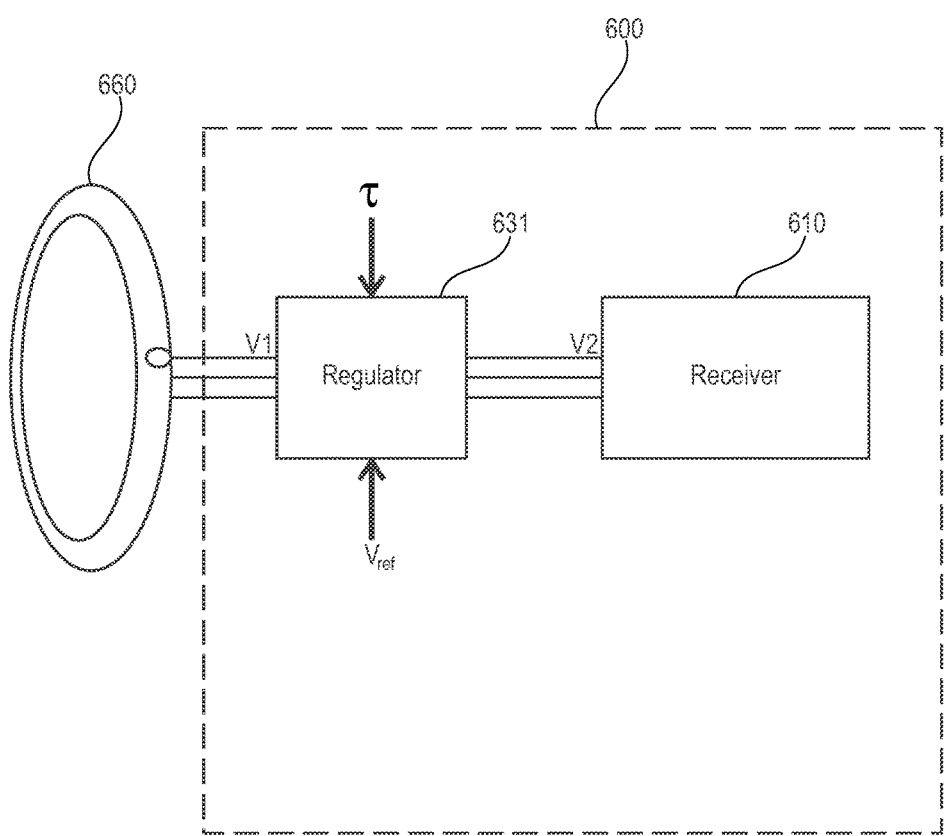
FIG. 6 shows a concept diagram of a contactless communication device in accordance with an embodiment.

Resuming the above embodiments, FIG. 6 shows a concept diagram of a contactless communication device 600 in accordance with an embodiment. The device 600 is connected to antenna 660 and comprises a regulator block 631 and a receiver unit 610. The voltage at the antenna input is V1. The regulator is connected to the antenna 660 and receives a reference voltage Vref and a time constant value τ (i.e. the first or second time constant value as discussed above) and regulates the voltage at the input of the receiver unit 610 to a voltage value V2, such that the latter is kept close to Vref.

It is noted that although the above embodiments relate to communication by use of inductive coupling, the described principles of input voltage regulation are applicable also to communication systems using other kinds of coupling, such as e.g. capacitive coupling. Furthermore, more than two different time constants may be utilized.

It is noted that, unless otherwise indicated, the use of terms such as "upper", "lower", "left", and "right" refers solely to the orientation of the corresponding drawing.

It is noted that the term "comprising" does not exclude other elements or steps and that the use of the articles "a" or "an" does not exclude a plurality. Also elements described in association with different embodiments may be combined. It should also be noted that reference signs in the claims should not be construed as limiting the scope of the claims.

The invention claimed is:

1. A contactless communication device, the device comprising:
   a receiver unit having an antenna input for connecting to an antenna, the receiver unit being configured to couple with a transmitting device and to receive an RF signal transmitted by the transmitting device, and to provide to a clock signal derived from the RF signal, the receiver unit being further configured to determine a point of time relating to a position of data within the RF signal;
   a programmable impedance circuit including a control terminal, opposing terminals, and a plurality of impedances, the plurality of impedances configured and arranged to respond to a comparator output signal presented at the control terminal by providing a selected impedance across the opposing terminals;
   a comparator configured receive the derived clock signal and in response to generate the comparator output signal which is indicative of a relationship between a voltage at the antenna input of the receiver unit and a reference voltage including an indication of whether a peak voltage corresponding to the received RF signal is greater or less than the reference voltage, wherein the selected impedance across the opposing terminals is based on the comparator output signal;
   a voltage regulation circuit coupled to the comparator and to the antenna input of the receiver unit, the voltage regulation circuit being configured to repetitively regulate the voltage at the antenna input in a control loop based on the comparator output signal and on a degree of gain sensitivity set by the selected impedance; and wherein the voltage regulation circuit is configured to separate each repetitive regulation of the voltage at the antenna input by a variable time constant which depends on the point of time and to apply a first voltage regulation step size prior to the point of time determined by the receiver unit and a second voltage regulation step size after the point of time, wherein the control loop has a variable bandwidth that corresponds to the variable time constant, and each of the first voltage regulation step size and the second voltage regulation step size is defined based on the selected impedance.

2. The device according to claim 1, wherein the plurality of impedances is a plurality of resistors.

3. The device according claim 1, wherein the voltage regulation circuit includes a controller circuit configured to interconnect a number of the plurality of impedances such that said impedances are connected in parallel.

4. The device according to claim 1,
wherein the variable time constant includes a first time constant that equals a first factor divided by a predetermined frequency, and includes a
second time constant that equals a second factor divided by the predetermined frequency.

5. The device according to claim 1, wherein the receiver unit is configured to operate in a card-mode and to determine the point of time as the time where a reader-command is received from the transmitting device.

6. The device according to claim 1, wherein the receiver unit is configured to operate in a reader-mode and to determine the point of time as the time where a preamble is received or where a predefined time grid begins or where a predetermined minimal time before reception expires.

7. The device according to claim 1, wherein a second time constant is infinite.

8. The device according to claim 1, further comprising:
a signal processor coupled to the receiver unit and configured to process signals received by the receiver unit, wherein the voltage regulation circuit is further configured to generate a signal processor control signal indicating that the signal processor is to be turned off for a predetermined period after each repetitive regulation of the voltage at the antenna input.

9. The device according claim 3, wherein the controller circuit is configured to interconnect the number of the plurality of impedances such that said impedances are connected in series.

10. The device according to claim 1, wherein the receiver unit is configured to determine the point of time by detecting particular RF signal content, and wherein a plurality of voltage regulation step sizes, including the first step size and the second step size, are defined relative to the point of time.

11. The device according to claim 1, wherein the receiver unit is configured to determine the point of time by adding a predetermined amount of time to a point of time where the RF signal is initially detected.

12. The device according to claim 1, wherein the comparator output signal indicates a number of impedances in a programmable impedance bank to be connected in parallel with each other and with the antenna input.

13. The device according to claim 1, wherein the receiver unit includes a differential receiver having a positive input terminal and a negative input terminal, and wherein the plurality of impendences includes a first impendence bank and a second impendence bank which are configured and arranged in series between the positive input terminal and the negative input terminal.

14. The device according to claim 1, further including a reference input terminal providing another reference voltage, wherein the receiver unit includes a differential receiver having a positive input terminal, a negative input terminal and a reference input terminal, and wherein the plurality of impendences includes a first impendence bank and a second impendence bank which are configured and arranged in series between the positive input terminal and the negative input terminal, and are electrically interconnected at the reference input terminal.

* * * * *